US009677705B2

(12) United States Patent
Cen

(10) Patent No.: US 9,677,705 B2
(45) Date of Patent: Jun. 13, 2017

(54) WALL HANGING FIXING DEVICE AND WALL HANGING BATHROOM ARTICLES

(75) Inventor: Difeng Cen, NingBo (CN)

(73) Assignee: NINGBO BOSHENG PLUMBING CO., LTD., Ningbo (CN)

( * ) Notice: Subject to any disclaimer, the term of this patent is extended or adjusted under 35 U.S.C. 154(b) by 731 days.

(21) Appl. No.: 13/988,318

(22) PCT Filed: Nov. 2, 2011

(86) PCT No.: PCT/CN2011/081677
§ 371 (c)(1),
(2), (4) Date: May 17, 2013

(87) PCT Pub. No.: WO2012/065513
PCT Pub. Date: May 24, 2012

(65) Prior Publication Data
US 2013/0228660 A1  Sep. 5, 2013

(30) Foreign Application Priority Data

Nov. 19, 2010  (CN) .......................... 2010 1 0551375
Nov. 19, 2010  (CN) ..................... 2010 2 0615564 U

(51) Int. Cl.
*A47F 5/08* (2006.01)
*F16M 13/02* (2006.01)
(Continued)

(52) U.S. Cl.
CPC ......... *F16M 13/02* (2013.01); *A47G 25/0635* (2013.01); *A47K 10/10* (2013.01); *A47G 25/0692* (2013.01); *A47H 1/02* (2013.01); *A47H 1/102* (2013.01); *A47H 1/104* (2013.01); *A47H 1/12* (2013.01); *A47H 1/122* (2013.01);
(Continued)

(58) Field of Classification Search
CPC .... A47K 10/04; A47K 10/10; A47K 2201/02; A47K 3/003; A47H 1/02; A47H 1/10; A47H 1/102; A47H 1/104; A47H 1/12; A47H 1/122; A47H 1/124; D06F 57/12;
(Continued)

(56) References Cited

U.S. PATENT DOCUMENTS 831,326 A  *  9/1906  Dale .................. 248/222.14
1,177,232 A  *  3/1916  Chisholm ............. F16B 21/09
211/87.01
(Continued)

*Primary Examiner* — Brian Mattei
*Assistant Examiner* — Taylor Morris
(74) *Attorney, Agent, or Firm* — Han IP Corporation; Andy M. Han

(57) ABSTRACT

A wall hanging fixing device includes a decoration cover which is provided with a hanging member in its inner side. The hanging member is fixed on a supporting seat in the inner side of the decoration cover with screws. The hanging member is provided with a hanging connection groove which is fit with a supporting member. The fixing device is also provided with a movable member that can move towards or away from the hanging connection groove. It is easy and quick to install the wall hanging fixing device. After an expansion bolt is fixed, the hanging member of the fixing device is hung on the expansion bolt without any disassembly, so as to protect the bathroom articles, and the hanging member can be fixed. This design effectively prevents loosening.

14 Claims, 5 Drawing Sheets

(51) Int. Cl.

| | | |
|---|---|---|
| *A47K 10/10* | (2006.01) | |
| *A47K 10/00* | (2006.01) | |
| *A47H 1/02* | (2006.01) | |
| *A47G 29/087* | (2006.01) | |
| *A47H 1/00* | (2006.01) | |
| *A47K 10/04* | (2006.01) | |
| *A47B 96/06* | (2006.01) | |
| *A47F 5/00* | (2006.01) | |
| *A47H 1/10* | (2006.01) | |
| *E04G 3/00* | (2006.01) | |
| *E04G 5/06* | (2006.01) | |
| *F16L 3/08* | (2006.01) | |
| *F21V 21/00* | (2006.01) | |
| *F21V 35/00* | (2006.01) | |
| *A47K 3/024* | (2006.01) | |
| *A47H 1/102* | (2006.01) | |
| *A47G 25/06* | (2006.01) | |
| *A47H 1/104* | (2006.01) | |
| *A47K 3/00* | (2006.01) | |
| *A47H 1/124* | (2006.01) | |
| *D06F 57/12* | (2006.01) | |
| *A47H 1/122* | (2006.01) | |
| *A47H 1/12* | (2006.01) | |

(52) U.S. Cl.
CPC .............. *A47H 1/124* (2013.01); *A47K 3/003* (2013.01); *A47K 10/04* (2013.01); *A47K 2201/02* (2013.01); *D06F 57/12* (2013.01)

(58) Field of Classification Search
CPC . A47G 25/0635; A47G 25/0692; F16M 13/02
USPC ... 248/205.1, 222.14, 223.41, 224.8, 222.13; 211/6, 16, 88.04, 105.1, 123, 109.009; 4/576.1

See application file for complete search history.

(56) References Cited

U.S. PATENT DOCUMENTS

| 2,144,602 | A | * | 1/1939 | Balmer | ................ | A47B 96/061 |
| | | | | | | 248/222.13 |
| 4,320,885 | A | * | 3/1982 | Kawazoe | ............... | F16M 11/04 |
| | | | | | | 24/649 |
| 4,662,593 | A | * | 5/1987 | Shames | ................ | A47K 10/10 |
| | | | | | | 248/201 |
| 4,998,701 | A | * | 3/1991 | Rawald | .............. | A47G 25/0635 |
| | | | | | | 248/205.1 |
| 5,957,615 | A | * | 9/1999 | Orain | ........................ | F16D 1/06 |
| | | | | | | 403/298 |
| 6,199,808 | B1 | * | 3/2001 | Lin | ........................ | A47K 10/10 |
| | | | | | | 211/105 |
| 6,279,257 | B1 | * | 8/2001 | Lemire | ................ | A47G 1/0655 |
| | | | | | | 248/476 |
| 6,334,597 | B1 | * | 1/2002 | Ming-Hsiao | ............ | A47K 10/10 |
| | | | | | | 248/305 |
| 6,651,830 | B2 | * | 11/2003 | Pan | ........................ | A47K 10/10 |
| | | | | | | 211/105.1 |
| 6,796,442 | B1 | * | 9/2004 | Wu | ........................ | A47K 10/04 |
| | | | | | | 211/105.1 |
| 2009/0242713 | A1 | * | 10/2009 | Lowe | ..................... | A47K 10/10 |
| | | | | | | 248/222.13 |

* cited by examiner

WALL HANGING FIXING DEVICE AND WALL HANGING BATHROOM ARTICLES

CROSS REFERENCE TO RELATED APPLICATIONS

This application is the U.S. national phase application of International application number PCT/CN2011/081677, filed 2 Nov. 2011, which claims the priority benefit of China Patent Application No. 201010551375.9, filed 19 Nov. 2010, and China Patent Application No. 201020615564.3, filed 19 Nov. 2010. The above-identified applications are hereby incorporated by reference in their entirety.

FIELD OF THE INVENTION

The present invention relates to a wall hanging fixing device and wall hanging bathroom articles.

BACKGROUND

Structure of and installation way for wall hanging fixing device usually presently available on the market typically includes the following: first, an expansion bolt is hammered into wall, and then a number of steps are taken as described below.

A fixed part is torn down (no need for tearing down in case of separate placement) from a bathroom hanging member, and then the fixed part is fixed on the expansion bolt. Next, the bathroom hanging member is fixed on the fixed part. Alternatively, a decoration cover on the bathroom hanging member is taken apart. Then, the fixed part which is integrated into the bathroom hanging member is fixed directly on the expansion bolt. Next, the decoration cover is screwed on. In this process, the bathroom articles are vulnerable to damage when they are affixed. Moreover, surfaces of the bathroom articles are vulnerable to damage when the decoration cover is installed. Furthermore, it is inconvenient to install bathroom articles because all accessories are connected together.

SUMMARY

The present invention aims to provide a wall hanging fixing device for easy installation by adopting a technical scheme as described below. The wall hanging fixing device includes a decoration cover which is provided with a hanging member in its inner side, and the hanging member is fixed on a supporting seat in the inner side of the decoration cover with screws. The hanging member is provided with a hanging connection groove which is fit with a supporting member, and the fixing device is also provided with a movable member that can move towards or away from the hanging connection groove. The movable member and the hanging member can match up and clamp the supporting member in the hanging connection groove. The fixing device is also provided with a bolt fixed axially. The bolt head is positioned on the edge of the decoration cover which is provided with an open pore matched to the bolt head. The movable member, subject to a threaded connection to the bolt and driven by the bolt, moves towards or away from the hanging connection groove. With such technical scheme, the present invention provides a wall hanging fixing device for quick installation. After an expansion bolt is fixed, the hanging member of the fixing device is hung on the expansion bolt. The bolt is screwed on and the bathroom hanging member can be firmly fixed without any disassembly, causing neither smudge nor scratch on the bathroom hanging member or the decoration cover to protect high-end bathroom articles, thus effectively preventing loosening.

When adopting the above-mentioned technical scheme, the following technical scheme may be adopted or jointly adopted.

The hanging member is provided with a hanging connection groove. The supporting member clamped by the movable member moves upward, on the basis of which the hanging connection groove is arranged on an upper side in the center of inside of the decoration cover.

The hanging member is provided with two paratactic hanging connection grooves. The supporting member clamped by the movable member moves upward, on the basis of which both the hanging connection grooves are symmetrically arranged on both upper sides in the center of the decoration cover.

The hanging member is provided with an axially positioning element of the bolt, which is divided in half and connected into a whole by screws and then connected to the hanging member.

The hanging member, shaped like a plate, serves as a cover plate of the open pore inside of the decoration cover.

Axial rotation of the movable member is restricted by inner wall of the cover plate of the decoration cover and by the hanging member.

The hanging member is provided with an axially positioning element of the bolt. Inside of the decoration cover is provided with a half body of the axially positioning element of the bolt. The fixing device is also provided with a press plate connected to the decoration cover, and the press plate is provided with the other half body of the axially positioning element.

The present invention aims to provide a wall hanging bathroom article of easy installation with a technical scheme as follows: The wall hanging bathroom article is provided with the wall hanging fixing device and a stabilizer blade of the wall hanging bathroom article. The stabilizer blade is fixedly connected to the decoration cover. Due to adoption of the technical scheme, after an expansion bolt is fixed, the hanging member is hung on the expansion bolt and the bolt is screwed on, and the wall hanging bathroom article can be fixed without any disassembly. This not only is quite convenient but also does not smudge the decoration cover of the wall hanging bathroom article.

DETAILED DESCRIPTION OF THE PREFERRED EMBODIMENTS

Figure 1:
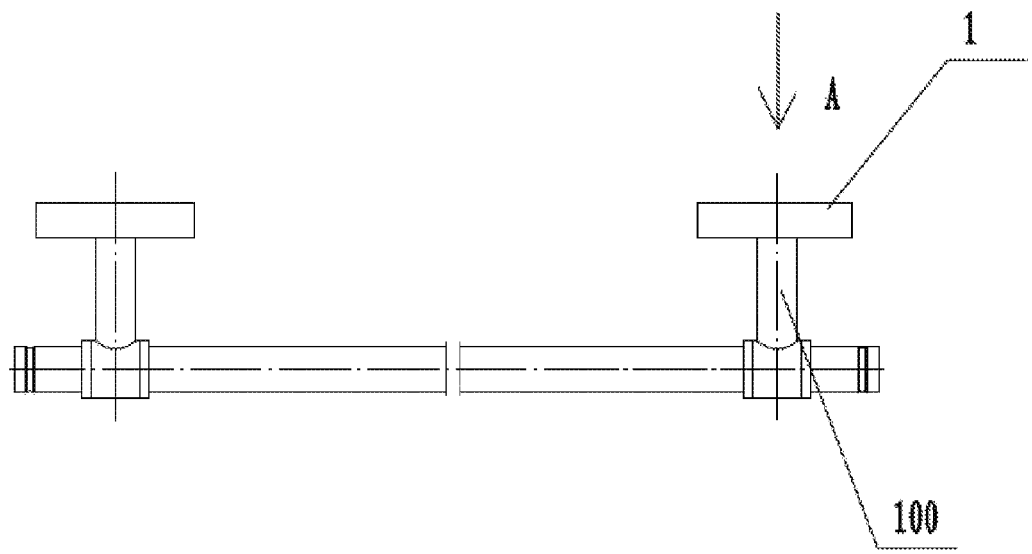
FIG. 1 is a top view of a wall hanging bathroom article.
Figure 2:
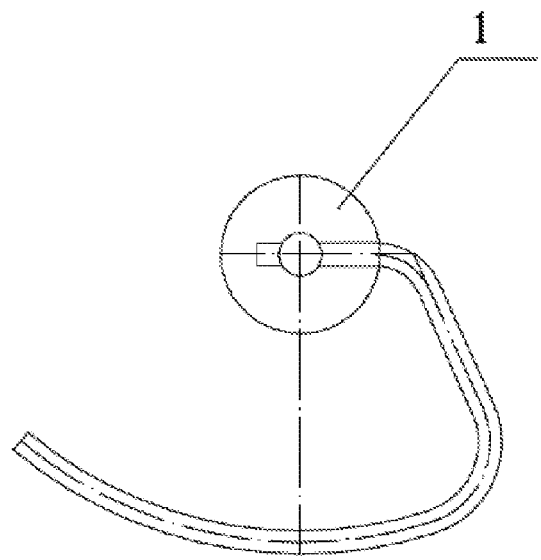
FIG. 2 is a front view of the wall hanging bathroom article.
Figure 3B:
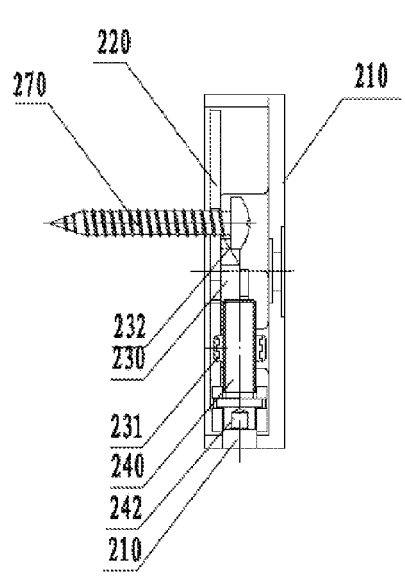
FIG. 3b is a cross-sectional view of FIG. 3a along line D-D.
Figure 3A:
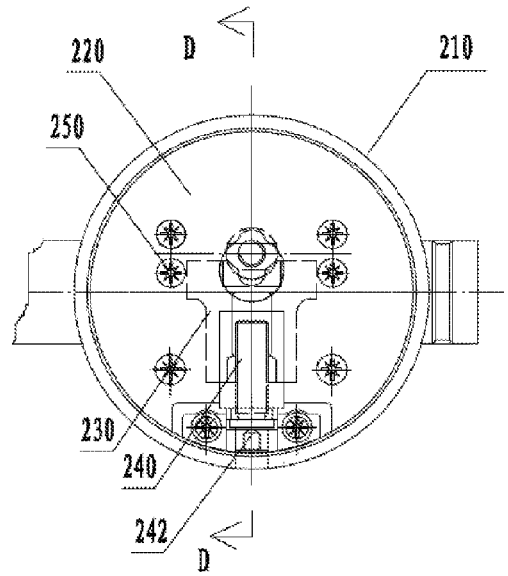
FIG. 3a is a plan view of FIG. 1 along direction A showing structure of a wall hanging fixing device when a hanging member and a movable member clamp a supporting member in accordance with embodiment 1.
Figure 4B:
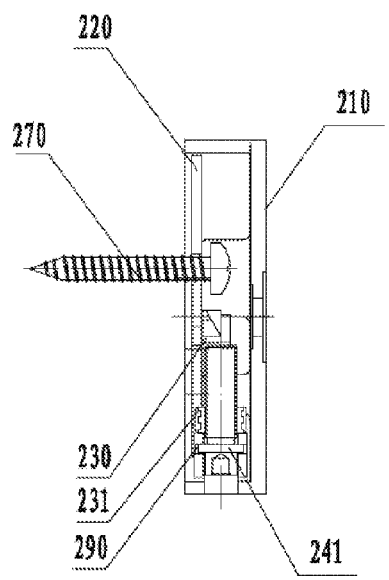
FIG. 4b is a cross-sectional view of FIG. 4a along line E-E.
Figure 4A:
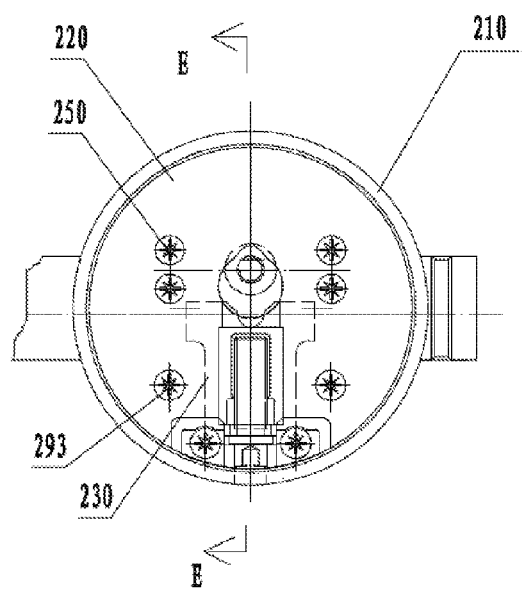
FIG. 4a is a plan view of FIG. 1 along direction A, showing structure of the wall hanging fixing device when the hanging member and the movable member do not clamp the supporting member in accordance with embodiment 1.
Figure 5:
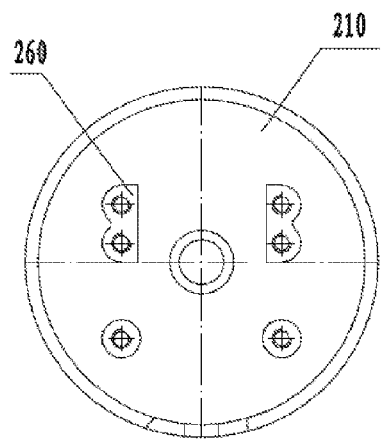
FIG. 5 is a rear view of a decoration cover in accordance with embodiment 1.

FIG. 1 shows an embodiment of the wall hanging bathroom article, which is a towel rack. FIG. 2 shows another embodiment of the wall hanging bathroom article, which is a towel ring. Both the towel rack and the towel ring are respectively provided with a stabilizer blade 100. The stabilizer blade 100 is connected to the wall hanging fixing device in accordance with embodiments of the present invention. Structure of the wall hanging fixing device is further described with the towel rack as an example.

The following description of embodiment 1 is made with reference to FIGS. 3a-10.

The present invention provides a wall hanging fixing device that includes a decoration cover 210. A hanging member 220 is provided inside the decoration cover 210, and the hanging member 220 is fixed on a supporting seat 260 in the inner side of the decoration cover 210 with screws 250. The hanging member 220 is provided with a hanging connection groove 222 which is fit with a supporting member. The hanging connection groove 222 is arranged inside the jack 221 of the supporting member. The fixing device is also provided with a movable member 230 that can move towards or away from the hanging connection groove 222. The movable member 230 and the hanging member 220 can match up and clamp the supporting member in the hanging connection groove 222. The fixing device is also provided with a bolt 240 fixed axially with a bolt head 242 positioned on an edge of the decoration cover 210 which is provided with an open pore 210 matched to the bolt head 242. The movable member 230, subject to a threaded connection to the bolt 240, moves towards or away from the hanging connection groove 222 when driven by the bolt 240. A nut 231 is provided inside the movable member 230 and is subject to a threaded connection to the bolt 240.

In an embodiment shown in FIGS. 3a-8, the hanging member 220 is provided with a hanging connection groove 222. The supporting member clamped by the movable member 230 moves upward. Based on this, the hanging connection groove 222, instead of at the edge of the decoration cover 210 is arranged on an upper side in the center of inside of the decoration cover 210. In this way, displacement due to clamping motion of the movable member 230 can be shortened, and interference with connection between a stabilizer blade 100 and the decoration cover 210 can be avoided.

A clamping part 232 matched between the movable member 230 and the hanging connection groove 222 is wedge-shaped. In this way, the fixing device can be clamped on the supporting member, and the fixing device can also be completely clamped on the supporting member in the axial direction along the decoration cover 210, thus preventing the fixing device from loosening.

In the present invention, the wall hanging fixing device is provided with an axially positioning element of the bolt 240, which is divided in half. One half body 291 is molded on the hanging member 220 or serves as an independent part. The other half body 292 is connected to the half body 291 by screws 293, constituting an axially positioning element which is connected to the hanging member 220. In this way, the bolt 240 is axially positioned and matched up with the axially positioning element, and a bulge loop 241 on the bolt 240 is stuck in a locating slot 290 in the axially positioning element. Thus, the bolt 240 is connected with the hanging member 220, and the movable member 230 is subject to a threaded connection with the bolt 240. In this way, the hanging member 220, the bolt 240 and the movable member 230 in the fixing device are connected into a whole, and are used as wildcard units and connected with decoration covers of different wall hanging bathroom articles. This design reduces manufacturing cost of the wall hanging fixing device and of the decoration covers, and further simplifies assembly work.

The hanging member 220, shaped like a plate, serves as a cover plate of the open pore inside of the decoration cover 210. In one embodiment, a flat shape feature of the decoration cover 210 is used, and axial rotation of the movable member 230 is restricted by an inner wall of the cover plate of the decoration cover 210 and by the hanging member 220.

Under the technical scheme, the supporting member can directly adopt an expansion bolt 270, rendering it unnecessary to use other parts as the supporting member.

Figure 9:
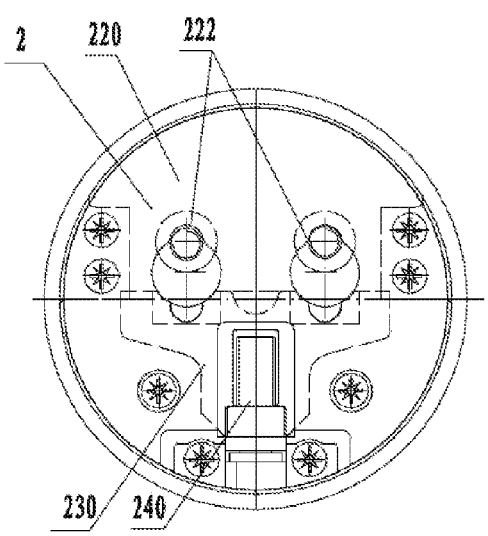
FIG. 9 is a rear view of the fixing device adopting a structure of double hanging connection grooves in accordance with embodiment 1.
Figure 6:
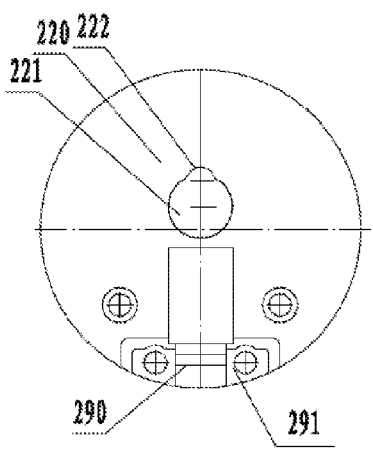
FIG. 6 is a front view of the hanging member in accordance with embodiment 1.
Figure 10:
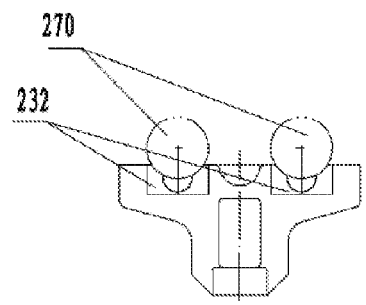
FIG. 10 is a front view of the movable member shown in FIG. 9.
Figure 7A:
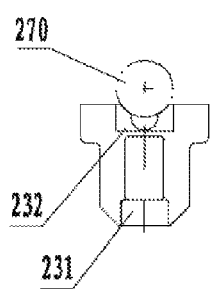
FIG. 7a is a front view of the movable member in accordance with embodiment 1.
Figure 7B:
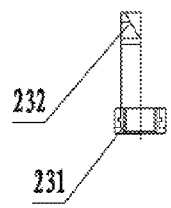
FIG. 7b is a side view of the movable member in accordance with embodiment 1.
Figure 8:
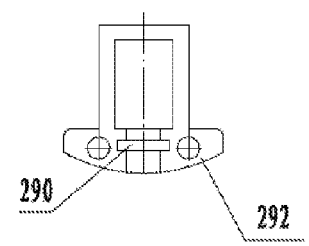
FIG. 8 is a diagram of a half body of an axially positioning element in accordance with embodiment 1.
Figure 11B:
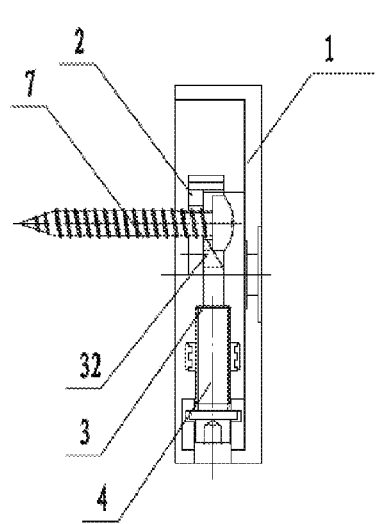
FIG. 11b is a cross-sectional view of FIG. 11a along line B-B.
Figure 11A:
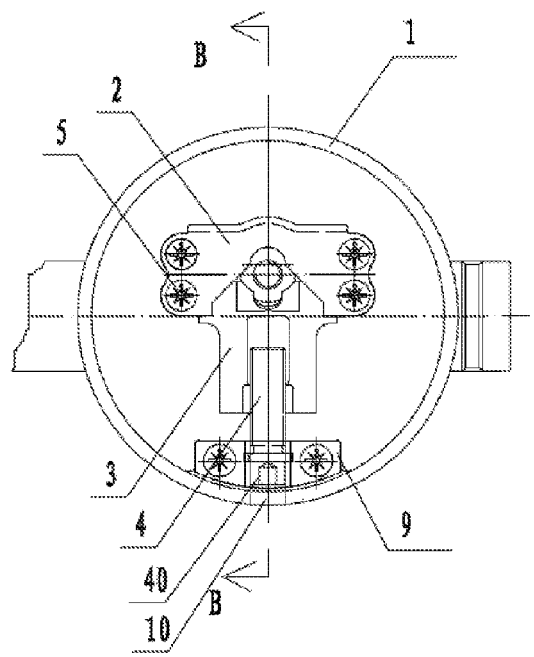
FIG. 11a is a plan view of FIG. 1 along direction A, showing structure of the wall hanging fixing device when the hanging member and the movable member clamp the supporting member in accordance with embodiment 2.
Figure 12B:
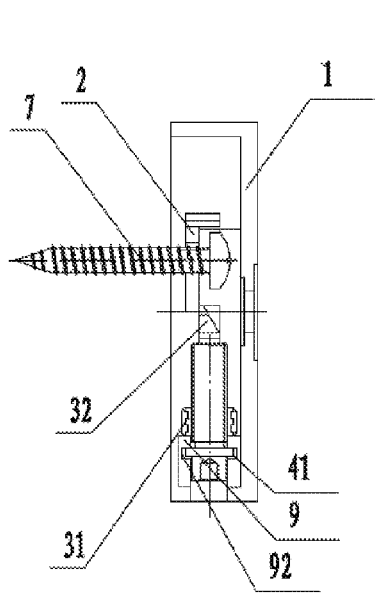
FIG. 12b is a cross-sectional view of FIG. 12a along line C-C.
Figure 12A:
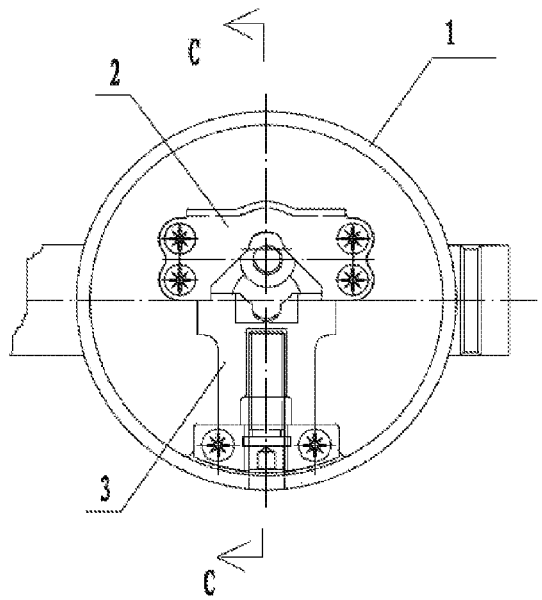
FIG. 12a is a plan view of FIG. 1 along direction A, showing structure of the wall hanging fixing device when the hanging member and the movable member do not clamp the supporting member in accordance with embodiment 2.
Figure 13:
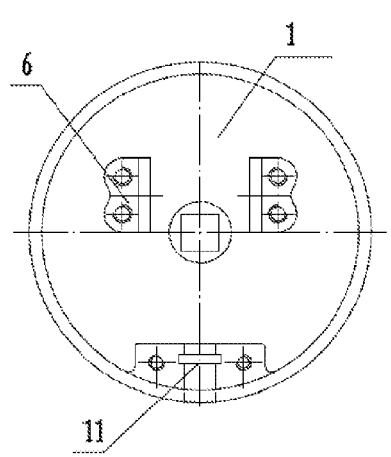
FIG. 13 is a rear view of the decoration cover in accordance with embodiment 2.
Figure 17:
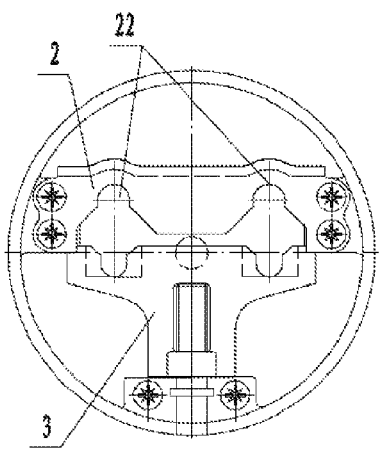
FIG. 17 is a rear view of the fixing device adopting a structure of double hanging connection grooves in accordance with embodiment 2.
Figure 14:
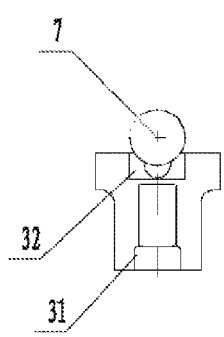
FIG. 14 is a front view of the movable member in accordance with embodiment 2.
Figure 18:
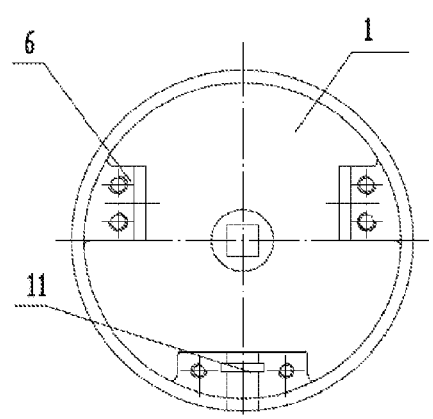
FIG. 18 is a rear view of the decoration cover shown in FIG. 17.
Figure 15:
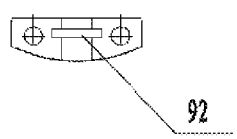
FIG. 15 is a front view of the press plate in accordance with embodiment 2.
Figure 16:
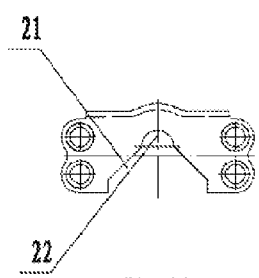
FIG. 16 is a front view of the hanging member in accordance with embodiment 2.
Figure 19:
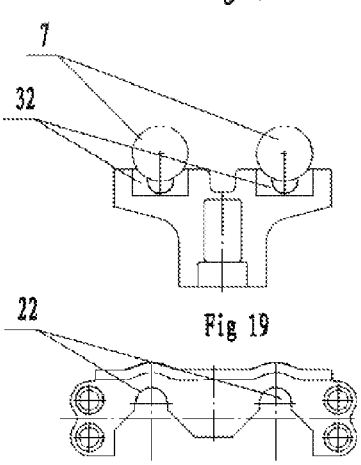
FIG. 19 is a front view of the movable member shown in FIG. 17.
Figure 20:
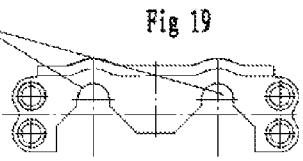
FIG. 20 is a front view of the hanging member shown in FIG. 17.

Referring to FIGS. 9-10, the hanging member 220 is provided with two paratactic hanging connection grooves 222. The supporting member clamped by the movable member 230 moves upward. Based on this, both the hanging connection grooves 222 are symmetrically arranged on both upper sides in the center of the decoration cover 210, which not only makes the fixing device more stable during installation but also makes fixation strength higher after installation. Similarly, lifting stroke of the movable member 230 can be shortened, and interference with connection between the stabilizer blade 100 and the decoration cover 210 can be avoided. Accordingly, the movable member 230 is provided with two clamping parts 232 respectively matched to both the hanging connection grooves 222. Other structures of the embodiment shown in FIGS. 9-10 are identical to those of the embodiment shown in FIGS. 3a-8. Identical numeral references in FIGS. 9-10 and FIGS. 3a-8 denote identical meanings.

The following description of embodiment 2 is made with reference to FIGS. 11a-20.

The present invention provides a wall hanging fixing device that includes a decoration cover 1. A hanging member 2 is provided inside the decoration cover 1, and the hanging member 2 is fixed on a supporting seat 6 in the inner side of the decoration cover 1 with screws 5. The hanging member 2 is provided with a hanging connection groove 22 which is fit with a supporting member. The hanging connection groove 22 is arranged inside the inlet 21 of the supporting member. The fixing device is also provided with a movable member 3 that can move towards or away from the hanging connection groove 22. The movable member 3 and the hanging member 2 can match up and clamp the supporting member in the hanging connection groove 22. The fixing device is also provided with a bolt 4 fixed axially. A bolt head 40 of the bolt 4 is positioned on an edge of the decoration cover 1 which is provided with an open pore 10 matched to the bolt head 40. The movable member, subject to a threaded connection to the bolt 4, moves towards or away from the hanging connection groove 22 when driven by the bolt 4. A nut 31 is provided inside the movable member 3 and is subject to a threaded connection to the bolt 4.

As a mode of operation in accordance with the embodiment, with reference to FIGS. 11a-16, the hanging member 2 is provided with a hanging connection groove 22. The supporting member clamped by the movable member 3 moves upward. Based on this, the hanging connection groove 22, instead of at the edge of the decoration cover 1, is arranged on an upper side in the center of inside of the decoration cover 1. In this way, clamping motion displacement of the movable member 3 can be shortened, and interference with connection between the stabilizer blade 100 and the decoration cover 1 can be avoided.

In this embodiment, a flat shape feature of the decoration cover 1 is used, and axial rotation of the movable member 3 is restricted by an inner wall of the cover plate of the decoration cover 1.

A clamping part 32 between the movable member 3 and the hanging connection groove 22 is wedge-shaped. In this way, the fixing device can be clamped on the supporting member, and the fixing device can also be completely clamped on the supporting member in the axial direction along the decoration cover 1, thus preventing the fixing device from loosening.

A half body 11 of the axially positioning element of the bolt 4 is provided inside the decoration cover 1. The fixing device is also provided with a press plate 9 connected to the decoration cover 1, and the press plate 9 is provided with the other half body of the axially positioning element. The axially positioning element is a component provided with a bolt axially locating slot 92, and the bolt 4 is provided with a corresponding axially locating bulge loop 41.

Under the technical scheme, the supporting member can directly adopt an expansion bolt 7, rendering it unnecessary to use other parts as the supporting member.

Referring to FIGS. 17-20, the hanging member 2 is provided with two paratactic hanging connection grooves 22. The supporting member clamped by the movable member 3 moves upward, on the basis of which, both the hanging connection grooves 22 are symmetrically arranged on both upper sides in the center of the decoration cover. This design not only makes the fixing device more stable during installation, but also makes fixation strength higher after installation. Similarly, lifting stroke of the movable member 3 can be shortened, and interference with connection between the stabilizer blade 100 and the decoration cover 1 can be avoided. Accordingly, the movable member 3 is provided with two clamping parts 32 respectively matched to both the hanging connection grooves 22. Other structures of the embodiment shown in FIGS. 17-20 are identical to those of the embodiment shown in FIGS. 11a-16. Identical numeral references in FIGS. 17-20 and FIGS. 11a-16 denote identical meanings.

What is claimed is:

1. A wall hanging fixing device comprising:
a decoration cover provided with an open pore;
a supporting member;
a hanging member fixed on a supporting seat in an inner side of the decoration cover with screws, the hanging member including a hanging connection groove which is fit with the supporting member;
a movable member configured to move linearly towards or away from the hanging connection groove, the movable member having a wedge-shaped clamping part such that the wedge-shaped clamping part of the movable member and the hanging connection groove are configured to match up and clamp the supporting member when the movable member moves towards the hanging connection groove; and
a bolt having a bolt head positioned on an edge of the decoration cover with the open pore on the decoration cover positioned corresponding to the bolt head,
wherein the movable member, subject to a threaded connection to the bolt, moves towards or away from the hanging connection groove when driven by the bolt, and
wherein the wall hanging fixing device includes an axially positioning element of the bolt, wherein the axially positioning element comprises a first half and a second half, wherein the first half is molded on the hanging member, and wherein the second half is connected to the first half by screws.

2. The wall hanging fixing device of claim 1, wherein the supporting member is clamped by the movable member and moves upward, and wherein the hanging connection groove is arranged on an upper side in a center of an inside of the hanging member.

3. The wall hanging fixing device of claim 1, wherein the hanging member, shaped like a plate, serves as a cover plate for the open pore of the decoration cover.

4. The wall hanging fixing device of claim 3, wherein an axial rotation of the movable member is restricted by an inner wall of the cover plate.

5. A wall hanging bathroom article comprising the wall hanging fixing device of claim 1 and a stabilizer blade of a wall hanging bathroom article, wherein the stabilizer blade is fixedly connected to the decoration cover of the wall hanging fixing device.

6. The wall hanging fixing device of claim 2, wherein the wall hanging fixing device includes an axially positioning element of the bolt, wherein the axially positioning element comprises a first half and a second half, wherein the first half is molded on the hanging member, and wherein the second half is connected to the first half by screws.

7. The wall hanging fixing device of claim 6, wherein the hanging member, shaped like a plate, serves as a cover plate of the open pore of the decoration cover.

8. The wall hanging fixing device of claim 7, wherein an axial rotation of the movable member is restricted by an inner wall of the cover plate.

9. A wall hanging fixing device comprising:
a decoration cover provided with an open pore;
a supporting member;
a hanging member fixed on a supporting seat in an inner side of the decoration cover with screws, the hanging member including a hanging connection groove which is fit with the supporting member;
a movable member configured to move linearly towards or away from the hanging connection groove, the movable member having a wedge-shaped clamping part such that the wedge-shaped clamping part of the movable member and the hanging connection groove are configured to match up and clamp the supporting member when the movable member moves towards the hanging connection groove; and
a bolt having a bolt head positioned on an edge of the decoration cover with the open pore on the decoration cover positioned corresponding to the bolt head,
wherein the movable member, subject to a threaded connection to the bolt, moves towards or away from the hanging connection groove when driven by the bolt,
wherein the supporting member is clamped by the movable member and moves upward, and wherein the hanging connection groove is arranged on an upper side in a center of an inside of the hanging member, and
wherein the wall hanging fixing device includes an axially positioning element of the bolt, wherein the axially positioning element comprises a first half and a second half, wherein the first half is molded on the hanging member, and wherein the second half is connected to the first half by screws.

10. The wall hanging fixing device of claim 9, wherein the wall hanging fixing device includes an axially positioning element of the bolt, wherein the axially positioning element comprises a first half and a second half, wherein the first half is molded on the hanging member, and wherein the second half is connected to the first half by screws.

11. The wall hanging fixing device of claim 10, wherein the hanging member, shaped like a plate, serves as a cover plate for the open pore of the decoration cover.

12. The wall hanging fixing device of claim 11, wherein an axial rotation of the movable member is restricted by an inner wall of the cover plate.

13. The wall hanging fixing device of claim 9, wherein the hanging member, shaped like a plate, serves as a cover plate of the open pore of the decoration cover.

14. The wall hanging fixing device of claim 13, wherein an axial rotation of the movable member is restricted by an inner wall of the cover plate.

* * * * *